United States Patent Office 3,034,724
Patented May 15, 1962

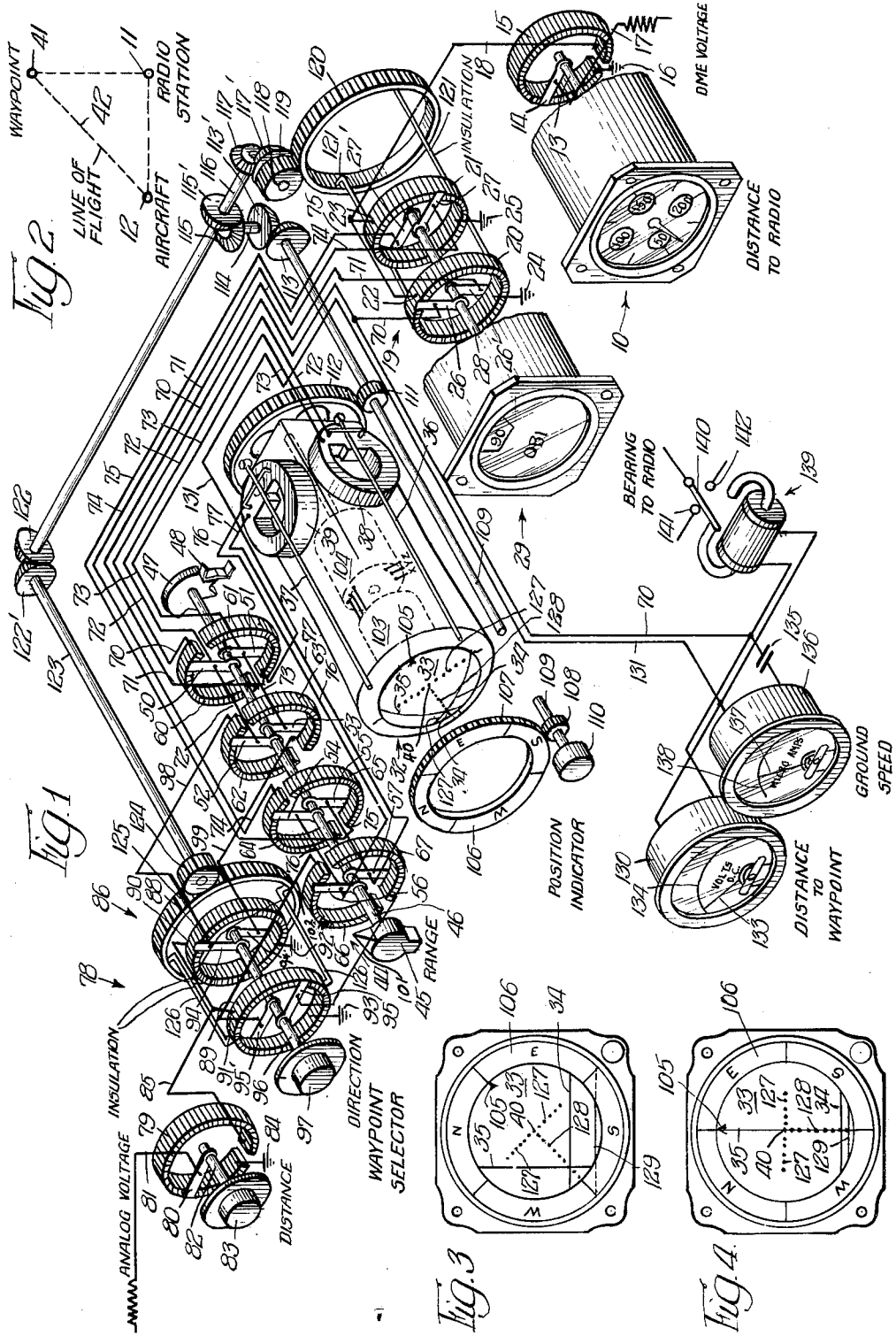

3,034,724
NAVIGATIONAL POSITION INDICATOR SYSTEM
Earl S. Perkins, Hinsdale, Ill., assignor to Butler Company, Chicago, Ill., a corporation of Illinois
Filed June 12, 1957, Ser. No. 665,351
28 Claims. (Cl. 235—187)

This invention relates to navigational systems. This application is a continuation-in-part of application Serial No. 439,504, filed June 28, 1954, now Patent No. 2,801,- 501, issued July 30, 1957.

Classical navigation has been handed down from ancient times and, although refined, the basic concept remains unchanged. In order to go in an aircraft from a point to a destination on or over the horizon the ship is headed toward a compass point on the horizon over which the desired landfall is most likely to be found. The past means of going from the point to the destination on or over the horizon predicated the existence not only of an indexed horizon but that the dirigibility of the craft was fixed in a direction along a lubber line or toward a prow. This fixed line of dirigibility and the azimuth scale fixed by the north magnetic pole or by a star is a navigation instrument in itself. Without this seemingly hypothetical instrument it is not possible to navigate by present day systems nor by ancient concepts. This mental implement, with the systems grown up around it, is not readily abandoned. However, if one is on a flying platform or in a helicopter and one cannot see the ground or a reference point it is hardly possible to determine direction of flight by its use.

Analyses of most navigation show that, when landfall occurs, one abandons all navigation systems for the more expedient one of directing the craft to the object in sight and using what might be called a kinetomatic sense to maneuver the craft to and around this destination. It might be said then that, in our search for a navigation system, no better one will be found for any or all types of aircraft than the one which is visible when the skyscrapers of the destination are on the horizon, a railroad track leading to the destination lies below, and a section line crosses this railroad track at each mile. As one follows the railroad track in such a system, all vectors are automatically solved including the azimuth vector and the wind vector. It is interesting to note now that, in a craft without a lubber line or a prow, there is no crab angle. In a ship with a lubber line or prow, if one considers the crab angle as a factor in the navigation problem, the wind vector has not been properly solved. It is being carried in an account much the same as in business, such as when one takes an item from the inventory account and places it in receivables. The complete solution is in hand when this account is converted into cash and the complete solution of a vector is in mind when it is converted to magnitude.

When one solves a vector it is no longer a vector. If one is conscious of a vector one does not have the solution. The solution of a vector is expressable in real numbers. Such a real number could, for instance, be rate of approach which is a variable dependent upon how one turns the steering mechanism of an aircraft but independent of the vector of wind, azimuth or convergence. Vectors, other than the wind which are usually carried in account rather than solved, are the azimuth vector and a small angle such as the one along a course to omni station, which seems to narrow down as one approaches the station or widen out as one leaves; the convergence angle.

The azimuth vector remains unsolved as long as a direction must be carried in mind or continuously fed into a computer while one is maintaining a course. To illustrate by means of the previous examples, assume that the skyscrapers of the destination are beyond the horizon and out of sight directly to the northwest. This northwest "direction" remains a vector regardless of how positive one is of the progress of the ship toward 315 degrees and until one has raised the railroad track and skyscrapers and can completely disregard any specific azimuth index in reaching them. One no longer needs a compass when the azimuth vector is solved.

Broadly stated then, the crab angle is an accounting of the wind vector of the azimuth vector, the latter being the identifying feature of a course containing magnetic variation and convergence errors. With these polar coordinates as factors, one must solve for time of arrival at a destination which is identified in R-theta or Cartesian coordinates.

As a further indication of the value of the skyscraper-railroad analogy assume two aircraft are approaching the metropolitan area, each assigned to a different railroad track and each assigned to a destination only a short distance apart. Perfect separation will be maintained when each craft follows its railroad track whereas no degree of perfection in magnetic compass systems, inertial systems, Doppler systems nor single beam radio beam-guidance systems known today would render certain this separation.

It is suggested that the skyscraper-railroad analogy approaches the Utopia in navigation, at least for terminal areas. A system which approaches or duplicates the effects of this approaches the ultimate in navigation means. Here then is a list of criteria for an airborne navigational computer analogous with visual reference which are among the objects of this invention:

(1) It should show a columnar path to any assigned destination.

(2) It should show the progress of the craft along this path, however narrow the path, however far the destination, however fast or slow the craft.

(3) It should work without magnetic information. The use of any magnetic information should be (a) to fix the relationship of the lubber line or any reference line of the craft to the line of progress; and (b) to initially identify a course after which it should be incidental to the problem.

(4) The solution should be in real numbers of magnitude and rate of speed; hence it should read-out distance and ground speed to the destination.

(5) It should show conformity with any projected orbital path around the destination.

A navigation computer system embodying these features divorces navigation from the earlier classical methods described above and provides a system akin to the skyscraper-railroad system that is sometimes available for contact navigation.

For a more complete understanding of the nature and scope of this invention reference can be had to the following detailed description, taken together with the accompanying drawing, in which:

FIGURE 1 is a perspective view, somewhat diagrammatic in character, illustrating a navigation system in which the present invention is embodied;

FIGURE 2 shows a typical map on which the position of an aircraft is represented with respect to a radio station and a waypoint;

FIGURE 3 is a view, in front elevation, of a cross pointer meter showing the relative positions of the face and horizontal and vertical pointers at the instant that a reading is taken employing a compass data receiver synchro with the intersection of the pointers corresponding to the position of the aircraft with respect to a waypoint; and FIGURE 4 is a view, similar to FIGURE 3, but showing the azimuth scale rotated to a position corresponding to the line of flight to a destination and with the vertical pointer located in a position corresponding to the line of flight while the horizontal pointer is positioned at a distance from the center corresponding to the distance that the aircraft is from the destination.

Referring now particularly to FIGURE 1, it will be observed that the reference character 10 designates distance measuring equipment which is carried by the aircraft and forms a part of a radio distance indicating system that is controlled by a radio transmitter at a reference point on the earth. For example, as shown in FIGURE 2, the radio station can be located at a point 11 and, under assumed conditions, the aircraft is indicated at a point 12 which is 25 miles due west of the radio station and thus has a bearing of 270° in relation thereto.

The distance measuring equipment 10 includes a shaft 13 which carries a contact arm 14 that makes contact engagement with a variable resistance device 15 in the form of a potentiometer which is grounded at 16. The contact arm 14 is connected by a conductor 17 to a direct voltage source indicated as a DME voltage the magnitude of which as applied between ground 16 and conductor 18, is controlled by the position of the arm 14 and is a function of the distance between the aircraft and the transmitting radio station. The distance measuring equipment 10 is described in more detail in the patent above referred to. The angular position of the shaft 13 shifts as a function of the distance to the controlling radio station 11 to effect a corresponding shift of the contact arm 14 along the potentiometer 15, thereby providing a voltage between ground 16 and conductor 18 which is a measure of the distance.

The voltage corresponding to the distance that the aircraft is away from the radio station is applied by the conductor 18 to a sine-cosine resolver that is indicated, generally, at 19. This device includes a pair of sine-cosine impedance devices 20 and 21 each of which comprises a potentiometer that is closed on itself. The conductor 18 is commonly connected to the impedance devices 20 and 21 at 22 and 23 and they are grounded as indicated at 24 and 25 at diametrically opposite points. Contact arms 26—26' and 27—27' are mounted on a shaft 28 for contact engagement, respectively, with the impedance devices 20 and 21. It will be observed that the contact arms 26—26' are positioned on the shaft 28 at right angles to the position of the contact arms 27—27'.

The shaft 28 is controlled by an omni bearing indicator that is indicated, generally, at 29. It is located on the aircraft and not only shows the bearing of the course that the craft should follow to reach the point of origin of the signals but also it is employed, as will be described hereinafter, to control the resolution of the voltage derived from the distance measuring equipment 10 into rectangular coordinates which are measured in such manner as to indicate on the craft its position with respect to the reference point or its position with respect to a waypoint as the case may be. In addition it is employed in maintaining the aircraft on a desired line of flight and indicating the distance that the aircraft is from its destination.

The omni bearing indicator 29 indicates a bearing of 90° which is the bearing of the aircraft 12, which was previously assumed to be located due west of the radio station 11 as shown in FIGURE 2.

The distance measuring equipment 10 in conjunction with the omni bearing indicator 29 are employed for controlling wholly or in part the operation of a cross pointer meter that is indicated, generally, at 32. The meter 32 includes a face 33 which is movable about an axis through its center in a manner to be described hereinafter. Movable with respect to the face 33 is a horizontal or distance indicating pointer 34 and at right angles thereto there is a vertical or course indicator pointer 35. The pointers 34 and 35 are carried, respectively, by hands 36 and 37 the positions of which are controlled by pointer moving means 38 and 39. They are of the D'Arsonval type and have a zero center. The pointer moving means 38 is controlled, wholly or in part, by the voltage which appears between the contact arms 26—26' while the pointer moving means 39 is controlled, wholly or in part, by the voltage appearing between the contact arms 27—27'.

At the center of the face 33 is a reference position 40 which is indicated by a dot. As will appear hereinafter this reference position 40 may represent the location of the radio station 11, FIGURE 2, or it may represent the location of a waypoint 41 which, under assumed conditions, is positioned 25 miles due north of the radio station 11. The line of flight between the aircraft 12 and the waypoint 41 is indicated by the broken line 42 and it will be assumed that the aircraft at 12 is following this line of flight 42 to the destination at the waypoint 41 where it may land or continue on to another waypoint.

It is desirable that it be possible to vary the effects of the voltages applied to the operating windings of the pointer moving means 38 and 39 in order that, under certain circumstances, there be a maximum movement of the pointers 34 and 35 for a minimum change in the applied voltage. For this purpose a range multiplier, shown generally at 44, is employed. It includes an operating knob 45 that is movable with respect to a scale (not shown) which shows the particular degree of multiplication. The associated instruments then carry appropriate scales or an appropriate multiplier is used in order to determine the actual reading. The knob 45 is fast on the shaft 46 which carries at its opposite end a notched cam 47 that cooperates with a click spring 48 to hold the shaft 46 in any position to which it may be moved. The range multiplier 44 can be arranged to operate in any one of four or five positions as may be desired.

The shaft 46 of the range multiplier 44 carries four pairs of contact arms 50—51, 52—53, 54—55 and 56—57. These pairs of contact arms cooperate respectively with pairs of semi-circular resistors 60—61, 62—63, 64—65 and 66—67. It will be observed that each contact arm of each pair moves with respect to and makes contact with a corresponding semi-circular resistor of each pair.

The sine-cosine resolver 19 is connected to the range multiplier 44. For this purpose conductors 70 and 71 interconnect the contact arms 26—26' and the semi-circular resistors 60—61. Conductors 72 and 73 interconnect the contact arms 50—51 and the pointer moving means 38. Conductors 74 and 75 interconnect the contact arms 27—27' and the semi-circular resistors 64—65. The contact arms 54—55 associated therewith are connected by conductors 76 and 77 to the pointer moving means 39. Using the apparatus thus far described, the positions of the horizontal and vertical pointers 34 and 35 are controlled in accordance with the position of the aircraft with reference to the transmitting radio station and their intersection indicates with respect to the reference position 40 on the face 33 the location of the aircraft with respect to the radio station. By changing the position of the range multiplier 44 the scale at which the position of the aircraft is shown with respect to the face 33 can be varied as desired. Under the assumed conditions with the aircraft 25 miles due west of the radio station, as illustrated in FIGURE 2, the horizontal pointer 34 would be positioned so as to extend through the reference position 40 while the vertical pointer 35 would be located to the left at a position corresponding to 25 miles from the reference position 40.

Since it is desirable to employ a waypoint, such as the waypoint 41 in FIGURE 2, for navigation purposes a waypoint selector, shown generally at 78, is employed. It will be understood that the geographical position of the waypoint is known to the aircraft navigator and its coordinates with respect to the radio station are well established. When it is desired to navigate with respect to a waypoint while using signals from a radio station distant therefrom, the waypoint selector 78 is adjusted in order to modify the operation of the cross pointer meter 32. When so modified the reference position 40 then corresponds to the geographical position of the waypoint rather than to the geographical position of the transmitting radio station.

The waypoint selector 78 includes means for providing a direct voltage which is a function of the distance between the radio station being employed and the waypoint to which it is desired to navigate. This voltage is varied by a variable resistance device 79 in the form of a potentiometer which has in engagement therewith a contact arm 80 that is connected by a conductor 81 to a voltage source. The contact arm 80 is mounted on a shaft 82 which carries a knob 83 which moves with respect to a scale in miles (not shown). For illustrative purposes, when the waypoint 41 is located 25 miles away from the radio station 11, the knob 83 is turned to a corresponding position so that a direct voltage is provided between ground 84 and a conductor 85 which is a function of the distance and in this particular case corresponds to the 25 miles between the radio station and the waypoint.

In order to resolve the voltage corresponding to the distance between the radio station and the waypoint into rectangular coordinates a sine-cosine resolver, shown generally at 86, is employed. It is identical in construction to the sine-cosine resolver 19 and includes sine-cosine impedance devices 88 and 89 to which the conductor 85 is connected at 90 and 91. They are grounded at 92 and 93 at diametrically opposite locations. Contact arms 94—94' and 95—95' engage the impedance devices 88 and 89. They are fast on a shaft 96 at positions which are at right angles to each other. The shaft 96 carries a knob 97 which is movable with respect to a scale marked in degrees (not shown). For the particular location of the waypoint 41 due north of the radio station 11, the knob 97 would be turned to the zero degree position.

The sine-cosine resolver 86 is connected through the range multiplier 44 to the cross pointer meter 32. For this purpose conductors 98 and 99 interconnect the contact arms 94—94' and the semi-circular resistors 62—63. Likewise conductors 101 and 102 interconnect the contact arms 95—95' and the semi-circular resistors 66—67. It will be observed that the conductors 72 and 73 commonly connect the respective contact arms 50—51 and 52—53 and that the conductors 76 and 77 commonly interconnect the respective contact arms 54—55 and 56—57. These interconnections permit the modification of the operating voltages applied to the pointer moving means 38 and 39 from the sine-cosine resolver 19 in accordance with the location of the waypoint as selected by the waypoint selector 78. Also the common adjustment of the range or scale at which the pointers 34 and 35 operate is controlled by the range multiplier 44. It will be recalled that the face 30 of the cross pointer meter 32 was described as being movable. Specifically it is movable about an axis through the reference position 40 at right angles to the face 33. For this purpose a compass data receiver synchro 103 is employed. It is driven through a differential synchro 104 through conductors X—Y—Z from a mechanism which operates in accordance with the direction of magnetic north. It may be a magnetic direction indicator compass. Thus the position of a pointer 105 carried by the face 33 near its periphery indicates with respect to an azimuth scale 106 the heading of the aircraft with respect to magnetic north. Under the assumed conditions with the aircraft located at 12 in FIGURE 2, the pointer 105 on the face 33 will be located in the position shown in FIGURE 3 and thus indicates that the aircraft is proceeding in a northeasterly direction.

In accordance with this invention provision is made for simultaneously shifting the positions of the face 33, sine-cosine resolver 19 and the sine-cosine resolver 86 together with the position of the azimuth scale 106 to the end that the vertical pointer 35 will be positioned centrally of the face 33 and through the reference position 40 while the horizontal pointer 34 will be positioned below the reference position 40 a distance corresponding to the distance that the aircraft is away from either the radio station 11 or the waypoint 41 as the case may be. When so adjusted the vertical pointer 35 then becomes a course indicating pointer while the horizontal pointer 34 becomes a distance indicating pointer. Depending upon the setting of the range multiplier 44, the position of the horizontal pointer 34 may or may not accurately reflect the distance that the aircraft is away from either the radio station 11 or the waypoint 41. Provision is made, as will appear hereinafter, for accurately indicating by separate means the distance that the aircraft is away from either the radio station or the waypoint.

In accordance with this invention the simultaneous adjustment of the several elements is effected solely by mechanical means. It will be understood that the illustration is diagrammatic and that various servo mechanisms can be employed.

The manner in which these simultaneous movements are effected now will be described. The azimuth scale 106 is rotatably mounted and around its periphery gear teeth 107 are provided which mesh with the teeth of a pinion 108 that is fast on a shaft 109. A knob 110 is mounted on the shaft 109 to permit manual rotation thereof. Also mounted on the shaft 109 is a second pinion 111 which meshes with the teeth of a gear wheel 112 that rotates the rotor of the differential synchro 104 for the purpose of shifting the face 33. At its other end a bevel gear 113 is mounted on the shaft 109 and it drives through a bevel gear 113' to a shaft 114 on which a bevel gear 115 is mounted that drives another bevel gear 115' which is carried by a transverse shaft 116. The latter drives through bevel gears 117 and 117' to a shaft 118 which carries a pinion 119. The pinion 119 drives a ring gear 120 which is mechanically connected by insulation arms 121 to the impedance devices 20 and 21 for rotating them conjointly about the axis of rotation of the shaft 28. Since any suitable means can be provided for rotatably mounting the impedance devices 20 and 21, the mounting is illustrated diagrammatically only. It will be understood that the connections at 22 and 23 and to ground at 24 and 25 will be effected by suitable brushes and collector rings. The transverse shaft 116 also drives through bevel gears 122 and 122' to a shaft 123 which carries a pinion 124. The pinion 124 drives a ring gear 125 to which the impedance devices 88 and 89 are connected by insulation arms 126. The mounting of the impedance devices 88 and 89 for rotation about the axis of rotation of the shaft 96 is the same as described for the impedance devices 20 and 21. Now it will be apparent that, when the knob 110 is rotated to rotate the shaft 109, the azimuth scale 106 is rotated together with a similar rotation of the face 33 and corresponding rotation of the impedance devices 20—21 and 88—89. The manner in which use is made of such simultaneous adjustments will be set forth presently.

As shown more clearly in FIGURE 3 of the drawing a scale 127 is provided on the face 33. This scale 127 comprises two sets of five dots along a line extending through the reference position 40 at the center of the face 33. This line is at right angles to a line extending from the pointer 105 through the reference position 40. Along the latter line nine dots are provided to form a scale 128 which, of course, is at right angles to the scale 127. The dots making up the scales 127 and 128 are uniformly spaced and are employed in conjunction with the pointers 34 and 35 to provide indications of distance.

Under certain conditions when the range multiplier 44 is set to operate the pointers 34 and 35 at a relatively large scale, and the navigation system is adjusted to position the pointer 35 in the center of the face 33 and through the reference position 40, the pointer 34 would tend to be moved off scale. To limit its movement a stop 129 is employed. Under such conditions when the pointer 34 is against the stop 129, it no longer provides a true indication. However, provision is made for taking care of this situation in a manner to be described.

With a view to providing an indication of the distance that the aircraft is away from either the radio station or the waypoint, as the case may be, when the range multiplier 44 is adjusted such that the horizontal pointer 34 is against the stop 129, a volt meter 130 is provided. It will be observed that it is connected across conductor 70 and a conductor 131 which is connected to the conductor 71 previously referred to. The voltage appearing between conductors 70 and 131 is a linear function of the distance that the aircraft is away from either the radio station or the waypoint when the system is adjusted to position the pointer 35 in the center of the face 33 and through the reference position 40. The volt meter 130 employs a pointer 133 that moves with respect to a scale 134 which is calibrated in miles.

Advantage is taken of the fact that the voltage between the conductors 70 and 131 changes in accordance with the speed of the aircraft relative to the ground to show such ground speed. For this purpose a capacitor 135 is connected in series with a microammeter 136 and between the conductors 70 and 131. The microammeter 136 measures the discharge of the capacitor 135 and reflects it in the movement of a pointer 137 with respect to a scale 138 which is calibrated in miles per hour.

When the aircraft passes over the destination, the voltage applied between conductors 70 and 131 changes polarity. Advantage is taken of this characteristic by employing a polarized relay, shown generally at 139, the winding of which is connected to the conductors 70 and 131 as shown. The relay 139 is provided with a movable contact 140 which is arranged to engage either stationary contact 141 or stationary contact 142 depending upon the direction of polarity change. Thus, as the aircraft passes over the destination, the polarized relay 139 is operated from one position to the other position. Advantage can be taken of this operation of the polarized relay 139 to effect any desired operation.

In describing the use of the navigation system illustrated in FIGURE 1 and described hereinbefore, it will be assumed that the aircraft is located at 12, as shown in FIGURE 2, 25 miles directly west of the radio station 11 and that the waypoint 41 has been selected as the destination which is 25 miles due north of the radio station 11. Assuming that the azimuth scale 106 is positioned as shown in FIGURE 3 and that the compass data receiver synchro 103 is energized through the differential synchro 104 to provide the magnetic bearing of the aircraft, the relationship is illustrated in FIGURE 3. Here the intersection of the pointers 34 and 35 indicates that the aircraft is 35 miles southwest of the waypoint 41 since they intersect over dot 7 on the scale 128. The pointer 105 is in the 45° or northeast position.

Next the pilot rotates the knob 110 through such an extent that the pointer 105 on the face 33 is rotated to the position shown in FIGURE 4 where the pointer 105 points vertically upwardly. The azimuth scale 106 is rotated correspondingly as shown. Actually what the pilot does is to rotate the knob 110 until the pointer 35 is in the center of the face 33 where it passes through the reference position 40. Then the pointer 34 is positioned below and parallel to the scale 127 and through the seventh dot from the reference position 40 along the scale 128. It will be apparent now that the pointer 35 then indicates the course that the craft is to follow to reach the waypoint 40 while the position of the pointer 34 with reference to the scale 128 indicates that the aircraft is 35 miles from the destination. This condition exists only as long as the pilot guides the aircraft to maintain the pointer 35 in a position through the reference position 40.

Next the pilot operates the range multiplier 44 to the position of maximum sensitivity. In this position the distance from one end to the other of the scale 127 indicates a distance of 1 mile so that the fifth dot from the reference position 40 on either side represents a distance of ½ mile from the reference position. Thus the pilot has a path indicated on the face 33 one mile in width which he can follow because of the scale used with the same degree of accuracy that he could follow a railroad track extending directly toward the destination.

However, with this range of maximum sensitivity, the pointer 34 is against the stop 129 and no longer indicates the true distance to waypoint or ultimate destination. Instead, the indication on the volt meter 130 shows the distance to the destination while the ammeter 136 shows the ground speed.

When the aircraft reaches the destinatiion represented by the waypoint 41 operating under the conditions set forth hereinbefore, the pointers 34 and 35 cross over the reference position 40, the volt meter 130 reads zero, the microammeter 136 continues to read the ground speed of the aircraft and the omni bearing indicator 29 shows 180° which is the bearing to the station.

The pilot then can select another waypoint and employ the same or different radio station and repeat the foregoing operations to continue the navigation of the aircraft. As the aircraft passes over the waypoint 41 under the assumed conditions, the polarized relay 139 is operated from one position to the other and advantage can be taken of the movement of contact 140 from one position to the other to effect any desired control function.

Since certain changes in the foregoing system and different embodiments of the invention can be made without departing from the spirit and scope thereof it is intended that all matter shown in the accompanying drawing and described hereinbefore shall be interpreted as illustrative and not in a limiting sense.

What is claimed as new is:

1. In a navigational system for a dirigible craft, the combination of distance measuring means thereon providing a voltage the magnitude of which represents the distance the craft is from a reference point on the earth, a pair of sine-cosine impedance devices each closed upon itself and having said voltage applied across diametrically opposite points thereof, a pair of contacts for each impedance device for engaging the same at diametrically opposite points, means commonly mounting said pairs of contacts to engage the respective impedance device in 90° spaced relation, means operatively connected to said mounting means to position said pairs of contacts according to the bearing of the craft with respect to said reference point; a cross pointer meter having a face with a reference position corresponding to said reference point, a vertical pointer movable to the right and left of said reference position, means for moving said vertical pointer connected to one of said pairs of contacts, a horizontal pointer movable above and below said reference position, and means for moving said horizontal pointer connected to the other of said pairs of contacts; said pair of impedance devices being conjointly shiftable about a common axis relative to said pairs of contacts, and means for shifting said impedance devices through an extent sufficient to cause said vertical pointer to shift to said reference position and said horizontal pointer to shift to a position away from said reference position corresponding to the distance the craft is away from said reference point.

2. In a naviagational system for a dirigible craft, the combination of distance measuring means thereon providing a voltage the magnitude of which represents the distance the craft is from a reference point on the earth, a pair of sine-cosine impedance devices each closed upon itself and having said voltage applied across diametrically opposite points thereof, a pair of contacts for each impedance device for engaging the same at diametrically opposite points, means commonly mounting said pairs of contacts to engage the respective impedance device in 90° spaced relation, means operatively connected to said mounting means to position said pairs of contacts according to the bearing of the craft with respect to said reference point; a cross pointer meter having a face with a reference position corresponding to said reference point, a vertical pointer movable to the right and left of said reference position, means for moving said vertical pointer connected to one of said pairs of contacts, a horizontal pointer movable above and below said reference position, and means for moving said horizontal pointer connected to the other of said pairs of contacts; said pair of impedance devices being conjointly shiftable about a common axis relative to said pairs of contacts, means for shifting said impedance devices through an extent sufficient to cause said vertical pointer to shift to said reference position and said horizontal pointer to shift to a position away from said reference position corresponding to the distance the craft is away from said reference point, and voltage responsive means connected across said other pair of contacts for indicating independently of said cross pointer meter the distance between the craft and said reference point.

3. In a navigational system for a dirigible craft, the combination of distance measuring means thereon providing a voltage the magnitude of which represents the distance the craft is from a reference point on the earth, a pair of sine-cosine impedance devices each closed upon itself and having said voltage applied across diametrically opposite points thereof, a pair of contacts for each impedance device for engaging the same at diametrically opposite points, means commonly mounting said pairs of contacts to engage the respective impedance device in 90° spaced relation, means operatively connected to said mounting means to position said pairs of contacts according to the bearing of the craft with respect to said reference point; a cross pointer meter having a face with a reference position corresponding to said reference point, a vertical pointer movable to the right and left of said reference position, means for moving said vertical pointer connected to one of said pairs of contacts, a horizontal pointer movable above and below said reference position, and means for moving said horizontal pointer connected to the other of said pairs of contacts; said pair of impedance devices being conjointly shiftable about a common axis relative to said pairs of contacts, means for shifting said impedance devices through an extent sufficient to cause said vertical pointer to shift to said reference position and said horizontal pointer to shift to a position away from said reference position corresponding to the distance the craft is away from said reference point, and means connected across said other pair of contacts and responsive to the change in the voltage therebetween as the craft moves with respect to said reference point for indicating the speed at which the craft is moving.

4. The invention as set forth in claim 3 wherein the voltage is a unidirectional voltage, a capacitor is charged to a potential corresponding to the voltage between the other pair of contacts, and an ammeter measures the discharge of said capacitor to provide the speed indication.

5. In a naviagational system for a dirigible craft, the combination of distance measuring means thereon providing a voltage the magnitude of which represents the distance the craft is from a reference point on the earth, a pair of sine-cosine impedance devices each closed upon itself and having said voltage applied across diametrically opposite points thereof, a pair of contacts for each impedance device for engaging the same at diametrically opposite points, means commonly mounting said pairs of contacts to engage the respective impedance device in 90° spaced relation, means operatively connected to said mounting means to position said pairs of contacts according to the bearing of the craft with respect to said reference point; a cross pointer meter having a face with a reference position corresponding to said reference point, a vertical pointer movable to the right and left of said reference position, means for moving said vertical pointer connected to one of said pairs of contacts, a horizontal pointer movable above and below said reference position, and means for moving said horizontal pointer connected to the other of said pairs of contacts; said pair of impedance devices being conjointly shiftable about a common axis relative to said pairs of contacts, means for shifting said impedance devices through an extent sufficient to cause said vertical pointer to shift to said reference position and said horizontal pointer to shift to a position away from said reference position corresponding to the distance the craft is away from said reference point, and means responsive to the change in the voltage between said other pair of contacts resulting from the craft passing said reference point for operating a device from one position to another.

6. The invention as set forth in claim 5 wherein the voltage between the other pair of contacts is a unidirectional voltage and the change therein is a change from one polarity to the other.

7. In a navigational system for a dirigible craft, the combination of distance measuring means thereon providing a voltage the magnitude of which represents the distance the craft is from a reference point on the earth, a pair of sine-cosine impedance devices each closed upon itself and having said voltage applied across diametrically opposite points thereof, a pair of contacts for each impedance device for engaging the same at diametrically opposite points, means commonly mounting said pairs of contacts to engage the respective impedance device in 90° spaced relation, means operatively connected to said mounting means to position said pairs of contacts according to the bearing of the craft with respect to said reference point; a cross pointer meter having a face with a reference position corresponding to said reference point, a horizontal scale on said face to the right and left of said reference position, a vertical scale below said reference position, a vertical pointer movable to the right and left of said reference position, means for moving said vertical pointer connected to one of said pairs of contacts, a horizontal pointer movable above and below said reference position, and means for moving said horizontal pointer connected to the other of said pairs of contacts; said pair of impedance devices being conjointly shiftable about a common axis relative to said pairs of contacts, means for shifting said impedance devices through an extent sufficient to cause said vertical pointer to shift to said reference position and said horizontal pointer to shift to a position away from said reference position corresponding to the distance the craft is away from said reference point, means for increasing the effects of said voltage as applied to said pointer moving means whereby said horizontal pointer tends to move off of said vertical scale, and means responsive to the magnitude of the voltage between said other pair of contacts and independent of said horizontal pointer for indicating the distance between the craft and said reference point.

8. In a navigational system for a dirigible craft, the combination of distance measuring means thereon providing a voltage the magnitude of which represents the distance the craft is from a reference point on the earth, a pair of sine-cosine impedance devices each closed upon itself and having said voltage applied across diametrically opposite points thereof, a pair of contacts for each impedance device for engaging the same at diametrically opposite points, means commonly mounting said pairs of contacts to engage the respective impedance device in 90° spaced relation, means operatively connected to said mounting means to position said pairs of contacts according to the bearing of the craft with respect to said reference point, a pair of waypoint sine-cosine impedance devices each closed upon itself, means for applying a voltage across diametrically opposite points of said waypoint impedance devices the magnitude of which represents the distance a waypoint is from said reference point, a pair of contacts for each waypoint impedance device for engaging the same at diametrically opposite points, means commonly mounting said pairs of waypoint contacts to engage the respective waypoint impedance device in 90° spaced relation and adjustable in accordance with the bearing of said waypoint with respect to said reference point; a cross pointer meter having a face with a reference position corresponding to said waypoint, a vertical pointer movable to the right and left of said reference position, means for moving said vertical pointer connected to be responsive to the voltages between corresponding pairs of contacts of the first and second mentioned impedance devices, a horizontal pointer movable above and below said reference position, and means for moving said horizontal pointer connected to be responsive to the voltages between the other corresponding pairs of contacts of said first and second mentioned impedance devices; each pair of impedance devices being individually conjointly shiftable relative to said pairs of contacts about a common axis, and means for simultaneously shifting said pairs of impedance devices through an extent sufficient to cause said vertical pointer to shift to said reference position and said horizontal pointer to shift to a position away from said reference position corresponding to the distance the craft is away from said waypoint.

9. In a navigational system for a dirigible craft, the combination of distance measuring means thereon providing a voltage the magnitude of which represents the distance the craft is from a reference point on the earth, a pair of sine-cosine impedance devices each closed upon itself and having said voltage applied across diametrically opposite points thereof, a pair of contacts for each impedance device for engaging the same at diametrically opposite points, means commonly mounting said pairs of contacts to engage the respective impedance device in 90° spaced relation, means operatively connected to said mounting means to position said pairs of contacts according to the bearing of the craft with respect to said reference point, a pair of waypoint sine-cosine impedance devices each closed upon itself, means for applying a voltage across diametrically opposite points of said waypoint impedance devices the magnitude of which represents the distance a waypoint is from said reference point, a pair of contacts for each waypoint impedance device for engaging the same at diametrically opposite points, means commonly muonting said pairs of waypoint contacts to engage the respective waypoint impedance device in 90° spaced relation and adjustable in accordance with the bearing of said waypoint with respect to said reference point; a cross pointer meter having a face with a reference position corresponding to said waypoint, a vertical pointer movable to the right and left of said reference position, means for moving said vertical pointer connected to be responsive to the voltages between corresponding pairs of contacts of the first and second mentioned impedance devices, a horizontal pointer movable above and below said reference position, and means for moving said horizontal pointer connected to be responsive to the voltages between the other corresponding pairs of contacts of said first and second mentioned impedance devices; each pair of impedance devices being individually conjointly shiftable relative to said pairs of contacts about a common axis, means for simultaneously shifting said pairs of impedance devices through an extent sufficient to cause said vertical pointer to shift to said reference position and said horizontal pointer to shift to a position away from said reference position corresponding to the distance the craft is away from said waypoint, and voltage responsive means connected across said other corresponding pairs of contacts of said first and second mentioned impedance devices for indicating independently of said cross pointer meter the distance between the craft and said waypoint.

10. In a navigational system for a dirigible craft, the combination of distance measuring means thereon providing a voltage the magnitude of which represents the distance the craft is from a reference point on the earth, a pair of sine-cosine impedance devices each closed upon itself and having said voltage applied across diametrically opposite points thereof, a pair of contacts for each impedance device for engaging the same at diametrically opposite points, means commonly mounting said pairs of contacts to engage the respective impedance device in 90° spaced relation, means operatively connected to said mounting means to position said pairs of contacts according to the bearing of the craft with respect to said reference point, a pair of waypoint sine-cosine impedance devices each closed upon itself, means for applying a voltage across diametrically opposite points of said waypoint impedance devices the magnitude of which represents the distance a waypoint is from said reference point, a pair of contacts for each waypoint impedance device for engaging the same at diametrically opposite points, means commonly mounting said pairs of waypoint contacts to engage the respective waypoint impedance device in 90° spaced relation and adjustable in accordance with the bearing of said waypoint with respect to said reference point; a cross pointer meter having a face with a reference position corresponding to said waypoint, a vertical pointer movable to the right and left of said reference position, means for moving said vertical pointer connected to be responsive to the voltages between corresponding pairs of contacts of the first and second mentioned impedance devices, a horizontal pointer movable above and below said reference position, and means for moving said horizontal pointer connected to be responsive to the voltages between the other corresponding pairs of contacts of said first and second mentioned impedance devices; each pair of impedance devices being individually conjointly shiftable relative to said pairs of contacts about a common axis, means for simultaneously shifting said pairs of impedance devices through an extent sufficient to cause said vertical pointer to shift to said reference position and said horizontal pointer to shift to a position away from said reference position corresponding to the distance the craft is away from said waypoint, and means connected across said other corresponding pairs of contacts of said first and second mentioned impedance devices and responsive to the change in the voltage therebetween as the craft moves with respect to said reference point for indicating the speed at which the craft is moving.

11. The invention as set forth in claim 10 wherein the voltages are unidirectional voltages, a capacitor is charged to a potential corresponding to the voltage between the other corresponding pairs of contacts of the first and second mentioned impedance devices, and an ammeter measures the discharge of said capacitor to provide the speed indication.

12. In a navigational system for a dirigible craft, the combination of distance measuring means thereon providing a voltage the magnitude of which represents the distance the craft is from a reference point on the earth, a pair of sine-cosine impedance devices each closed upon itself and having said voltage applied across diametrically opposite points thereof, a pair of contacts for each impedance device for engaging the same at diametrically opposite points, means commonly mounting said pairs of contacts to engage the respective impedance device in 90° spaced relation, means operatively connected to said mounting means to position said pairs of contacts according to the bearing of the craft with respect to said reference point, a pair of waypoint impedance sine-cosine devices each closed upon itself, means for applying a voltage across diametrically opposite points of said waypoint impedance devices the magnitude of which represents the distance a waypoint is from said reference point, a pair of contacts for each waypoint impedance device for engaging the same at diametrically opposite points, means commonly mounting said pairs of waypoint contacts to engage the respective waypoint impedance device in 90° spaced relation and adjustable in accordance with the bearing of said waypoint with respect to said reference point; a cross pointer meter having a face with a reference position corresponding to said waypoint, a vertical pointer movable to the right and left of said reference position, means for moving said vertical pointer connected to be responsive to the voltages between corresponding pairs of contacts of the first and second mentioned impedance devices, a horizontal pointer movable above and below said reference position, and means for moving said horizontal pointer connected to be responsive to the voltages between the other corresponding pairs of contacts of said first and second mentioned impedance devices; each pair of impedance devices being individually conjointly shiftable relative to said pairs of contacts about a common axis, means for simultaneously shifting said pairs of impedance devices through an extent sufficient to cause said vertical pointer to shift to said reference position and said horizontal pointer to shift to a position away from said reference position corresponding to the distance the craft is away from said waypoint, and means connected across said other corresponding pairs of contacts of said first and second mentioned impedance devices and responsive to the change in the voltage therebetween resulting from the craft passing said waypoint for operating a device from one position to another.

13. The invention as set forth in claim 12 wherein the voltages are unidirectional voltages and the net change in the voltage between the other corresponding pairs of contacts of the first and second mentioned impedance devices is from one polarity to the other.

14. In a navigational system for a dirigible craft, the combination of distance measuring means thereon providing a voltage the magnitude of which represents the distance the craft is from a reference point on the earth, a pair of sine-cosine impedance devices each closed upon itself and having said voltage applied across diametrically opposite points thereof, a pair of contacts for each impedance device for engaging the same at diametrically opposite points, means commonly mounting said pairs of contacts to engage the respective impedance device in 90° spaced relation, means operatively connected to said mounting means to position said pairs of contacts according to the bearing of the craft with respect to said reference point, a pair of waypoint sine-cosine impedance devices each closed upon itself, means for applying a voltage across diametrically opposite points of said waypoint impedance devices the magnitude of which represents the distance a waypoint is from said reference point, a pair of contacts for each waypoint impedance device for engaging the same at diametrically opposite points, means commonly mounting said pairs of waypoint contacts to engage the respective waypoint impedance device in 90° spaced relation and adjustable in accordance with the bearing of said waypoint with respect to said reference point; a cross pointer meter having a face with a reference position corresponding to said waypoint, a horizontal scale on said face to the right and left of said reference position, a vertical scale below said reference position, a vertical pointer movable to the right and left of said reference position, means for moving said vertical pointer connected to be responsive to the voltages between corresponding pairs of contacts of the first and second mentioned impedance devices, a horizontal pointer movable above and below said reference position, and means for moving said horizontal pointer connected to be responsive to the voltages between the other corresponding pairs of contacts of said first and second mentioned impedance devices; each pair of impedance devices being individually conjointly shiftable relative to said pairs of contacts about a common axis, means for simultaneously shifting said pairs of impedance devices through an extent sufficient to cause said vertical pointer to shift to said reference position and said horizontal pointer to shift to a position away from said reference position corresponding to the distance the craft is away from said waypoint, means for increasing the effects of said voltages as applied to said pointer moving means whereby said horizontal pointer tends to move off of said vertical scale, and means responsive to the magnitude of the voltage between said other pairs of contacts of said first and second impedance devices and independent of said horizontal pointer for indicating the distance between the craft and said waypoint.

15. In a navigational system for a dirigible craft, the combination of means for providing thereon two voltages the magnitudes of which represent, respectively, the distance the craft is north or south and the distance the craft is east or west of a reference point on the earth; a cross pointer meter having a reference position corresponding to said reference point, a rotatable face on which said reference point can be located, a surrounding rotatable azimuth scale, a vertical pointer movable to the right and left of said reference position, and a horizontal pointer movable above and below said reference position; means responsive to one of said voltages for moving said vertical pointer away from said reference position, means responsive to the other voltage for moving said horizontal pointer away from said reference position, means for controlling the energization of said means responsive to said one voltage whereby said vertical pointer is shiftable from its position away from said reference position to said reference position, means for controlling the energization of said means responsive to said other voltage whereby said horizontal pointer is shiftable from its position away from said reference position to a position away therefrom corresponding to the distance the craft is away from said reference point, and means for rotating said face and said azimuth scale to position the same relative to said vertical pointer in said reference position.

16. In a navigational system for a dirigible craft, the combination of means for providing thereon two voltages the magnitudes of which represent, respectively, the distance the craft is north or south and the distance the craft is east or west of a reference point on the earth; a cross pointer meter having a reference position corresponding to said reference point, a rotatable face on which said reference point can be located, a surrounding rotatable azimuth scale, a vertical pointer movable to the right and left of said reference position, and a horizontal pointer movable above and below said reference position; means responsive to one of said voltages for moving said vertical pointer away from said reference position, means responsive to the other voltage for moving said horizontal pointer away from said reference position, means for controlling the energization of said means responsive to said one voltage whereby said vertical pointer is shiftable from its positoin away from said reference position to said reference position, means for controlling the energization of said means responsive to said other voltage whereby said horizontal pointer is shiftable from its position to a position away therefrom corresponding to the distance the craft is away from said reference point, means for rotating said face and said azimuth scale to position the same relative to said vertical pointer in said reference position, and means responsive to the magnitude of said other voltage and independent of said cross pointer meter for indicating the distance between the craft and said reference point.

17. In a navigational system for a dirigible craft, the combination of means for providing thereon two voltages the magnitudes of which represent, respectively, the distance the craft is north or south and the distance the craft is east or west of a reference point on the earth; a cross pointer meter having a reference position corresponding to said reference point, a rotatable face on which said reference point can be located, a surrounding rotatable azimuth scale, a vertical pointer movable to the right and left of said reference position, and a horizontal pointer movable above and below said reference position; means responsive to one of said voltages for moving said vertical pointer away from said reference position, means responsive to the other voltage for moving said horizontal pointer away from said reference position, means for controlling the energization of said means responsive to said one voltage whereby said vertical pointer is shiftable from its position away from said reference position to said reference position, means for controlling the energization of said means responsive to said other voltage whereby said horizontal pointer is shiftable from its position away from said reference position to a position away therefrom corresponding to the distance the craft is away from said reference point, means for rotating said face and said azimuth scale to position the same relative to said vertical pointer in said reference position, and means responsive to the change in the magnitude of said other voltage as the craft moves with respect to said reference point for indicating the speed at which the craft is moving.

18. The invention as set forth in claim 17 wherein the voltages are unidirectional voltages, a capacitor is charged to a potential corresponding to the other voltage, and an ammeter measures the discharge of said capacitor to provide the speed indication.

19. In a navigational system for a dirigible craft, the combination of means for providing thereon two voltages the magnitudes of which represent, respectively, the distance the craft is north or south and the distance the craft is east or west of a reference point on the earth; a cross pointer meter having a reference position corresponding to said reference point, a rotatable face on which said reference point can be located, a surrounding rotatable azimuth scale, a vertical pointer movable to the right and left of said reference position, and a horizontal pointer movable above and below said reference position; means responsive to one of said voltages for moving said vertical pointer away from said reference position, means responsive to the other voltage for moving said horizontal pointer away from said reference position, means for controlling the energization of said means responsive to said one voltage whereby said vertical pointer is shiftable from its position away from said reference position to said reference position, means for controlling the energization of said means responsive to said other voltage whereby said horizontal pointer is shiftable from its position away from said reference position to a position away therefrom corresponding to the distance the craft is away from said reference point, means for rotating said face and said azimuth scale to posiiton the same relative to said vertical pointer in said reference position, and means responsive to the change in said other voltage resulting from the craft passing said reference point for operating a device from one position to another.

20. The invention as set forth in claim 19 wherein the voltages are unidirectional voltages and the change in the other voltage is a change from one polarity to the other.

21. In a navigational system for a dirigible craft, the combination of means for providing thereon two voltages the magnitudes of which represent, respectively, the distance the craft is north or south and the distance the craft is east or west of a reference point on the earth; a cross pointer meter having a reference position corresponding to said reference point, a rotatable face on which said reference point can be located, a surrounding rotatable azimuth scale, a horizontal scale to the right and left of said reference position, a vertical scale below said reference position, a vertical pointer movable to the right and left of said reference position, and a horizontal pointer movable above and below said reference position; means responsive to one of said voltages for moving said vertical pointer away from said reference position, means responsive to the other voltage for moving said horizontal pointer away from said reference position, means for controlling the energization of said means responsive to said one voltage whereby said vertical pointer is shiftable from its position away from said reference position to said reference position, means for controlling the energization of said means responsive to said other voltage whereby said horizontal pointer is shiftable from its position away from said reference position to a position away therefrom corresponding to the distance the craft is away from said reference point, means for rotating said face and said azimuth scale to position the same relative to said vertical pointer in said reference position, means for increasing the sensitivity of said pointer moving means whereby said horizontal pointer tends to move off of said vertical scale, and means responsive to the magnitude of said other voltage and independent of said horizontal pointer moving means for indicating the distance between the craft and said reference point.

22. In a navigational system for a dirigible craft, the combination of means for providing thereon two voltages the magnitudes of which represent, respectively, the distance the craft is north or south and the distance the craft is east or west of a reference point on the earth, means providing on the craft two additional voltages the magnitudes of which represent, respectively, the distance a waypoint on the earth is north or south and the distance the waypoint is east or west of said reference point; a cross pointer meter having a reference position corresponding to said waypoint, a vertical pointer movable to the right and left of said reference position, and a horizontal pointer movable above and below said reference position; means responsive to said voltages representing the east and west distances for moving said vertical pointer away from said reference position, means responsive to said voltages representing the north and south distances for moving said horizontal pointer away from said reference position, and means for simultaneously controlling the energization of said pointer moving means whereby said vertical pointer is shiftable from its position away from said reference position to said reference position and said horizontal pointer is shiftable away from its position away from said reference position to a position away therefrom corresponding to the distance the craft is away from said waypoint.

23. In a navigational system for a dirigible craft, the combination of means for providing thereon two voltages the magnitudes of which represent, respectively, the distance the craft is north or south and the distance the craft is east or west of a reference point on the earth, means providing on the craft two additional voltages the magnitudes of which represent, respectively, the distance a waypoint on the earth is north or south and the distance the waypoint is east or west of said reference point; a cross pointer meter having a reference position corresponding to said waypoint, a vertical pointer movable to the right and left of said reference position, and a horizontal pointer movable above and below said reference position; means responsive to said voltages representing the east and west distances for moving said vertical pointer away from said reference position, means responsive to said voltages representing the north and south distances for moving said horizontal pointer away from said reference position, means for simultaneously controlling the energization of said pointer moving means whereby said vertical pointer is shiftable from its position away from said reference position to said reference position and said horizontal pointer is shiftable away from its position away from said reference position to a position away therefrom and corresponding to the distance the craft is away from said waypoint, and means responsive to the magnitude of said voltage representing said north and south distances and independent of said cross pointer meter for indicating the distance between the craft and said waypoint.

24. In a navigational system for a dirigible craft, the combination of means for providing thereon two voltages the magnitudes of which represent, respectively, the distance the craft is north or south and the distance the craft is east or west of a reference point on the earth, means providing on the craft two additional voltages the magnitudes of which represent, respectively, the distance a waypoint on the earth is north or south and the distance the waypoint is east or west of said reference point; a cross pointer meter having a reference position corresponding to said waypoint, a vertical pointer movable to the right and left of said reference position, and a horizontal pointer movable above and below said reference position; means responsive to said voltages representing the east and west distances for moving said vertical pointer away from said reference position, means for simultaneously controlling the energization of said pointer moving means whereby said vertical pointer is shiftable from its position away from said reference position to said reference position and said horizontal pointer is shiftable away from its position away from said reference position to a position away therefrom corresponding to the distance the craft is away from said waypoint, and means responsive to the change in the magnitude of the voltage representing the distance the craft is north or south of said reference point for indicating the speed at which the craft is moving.

25. The invention as set forth in claim 24 wherein the voltages are unidirectional voltages, a capacitor is charged to a potential corresponding to the voltage representing said north and south distances, and an ammeter measures the discharge of said capacitor to provide the speed indication.

26. In a navigational system for a dirigible craft, the combination of means for providing thereon two voltages the magnitudes of which represent, respectively, the distance the craft is north or south and the distance the craft is east or west of a reference point on the earth, means providing on the craft two additional voltages the magnitudes of which represent, respectively, the distance a waypoint on the earth is north or south and the distance the waypoint is east or west of said reference point; a cross pointer meter having a reference position corresponding to said waypoint, a vertical pointer movable to the right and left of said reference position, and a horizontal pointer movable above and below said reference position; means responsive to said voltages representing the east and west distances for moving said vertical pointer away from said reference position, means responsive to said voltages representing the north and south distances for moving said horizontal pointer away from said reference position, means for simultaneously controlling the energization of said pointer moving means whereby said vertical pointer is shiftable from its position away from said reference position to said reference position and said horizontal pointer is shiftable away from its position away from said reference position to a position away therefrom corresponding to the distance the craft is away from said waypoint, and means responsive to the change in the voltage representing the distance the craft is north or south of said waypoint resulting from the craft passing the same for operating a device from one position to another.

27. The invention as set forth in claim 26 wherein the voltages are unidirectional voltages and the net change in the voltage representing the distance the craft is north or south of the waypoint is from one polarity to the other.

28. In a navigational system for a dirigible craft, the combination of means for providing thereon two voltages the magntiudes of which represent, respectively, the distance the craft is north or south and the distance the craft is east or west of a reference point on the earth, means providing on the craft two additional voltages the magnitudes of which represent, respectively, the distance a waypoint on the earth is north or south and the distance the waypoint is east or west of said reference point, a cross pointer meter having a reference position corresponding to said waypoint, a horizontal scale to the right and left of said reference position, a vertical scale below said reference position, a vertical pointer movable to the right and left of said reference position, and a horizontal pointer movable above and below said reference position; means responsive to said voltages representing the east and west distances for moving said vertical pointer away from said reference position, means responsive to said voltages representing the north and south distances for moving said horizontal pointer away from reference position, means for simultaneously controlling the energization of said pointer moving means whereby said vertical pointer is shiftable from its position away from said reference position to said reference position and said horizontal pointer is shiftable away from its position away from said reference position to a position away therefrom corresponding to the distance the craft is away from said waypoint, means for increasing the sensitivity of said pointer moving means whereby said horizontal pointer tends to move off of said vertical scale, and means responsive to the magnitude of said voltages representing said north and south distances and independent of said horizontal pointer moving means for indicating the distance between the craft and said waypoint.

References Cited in the file of this patent

UNITED STATES PATENTS

| | | |
|---|---|---|
| 2,385,334 | Davey | Sept. 25, 1945 |
| 2,432,939 | Sanders | Dec. 16, 1947 |
| 2,532,158 | Ewing | Nov. 28, 1950 |
| 2,560,527 | Dehmel | July 10, 1951 |
| 2,801,051 | Perkins | July 30, 1957 |
| 2,936,950 | Parsons | May 17, 1960 |

FOREIGN PATENTS

| | | |
|---|---|---|
| 746,732 | Great Britain | Mar. 21, 1956 |

OTHER REFERENCES

Aviation Week ("New Picture Aid for ILS—Omnirange," by S. H. Reiniger), July 2, 1951, pp. 43, 44, 47, 48.

IRE Transactions on Aeronautical and Navigational Electronics ("Engineering Techniques in the Simulator Evaluation of Flight Information Displays," by Frank Klimowski, Jr.), September 1956, pp. 128–135.